United States Patent
Athreya et al.

(10) Patent No.: US 8,838,653 B2
(45) Date of Patent: Sep. 16, 2014

(54) TRANSLATING AN OBJECT-ORIENTED DATA MODEL TO A YANG DATA MODEL

(75) Inventors: Arjun P. Athreya, Palo Alto, CA (US); L. Alexander Clemm, Los Gatos, CA (US); Jung Tjong, Sunnyvale, CA (US); Prasad Sanampudi, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 298 days.

(21) Appl. No.: 12/917,369

(22) Filed: Nov. 1, 2010

(65) Prior Publication Data

US 2012/0110028 A1   May 3, 2012

(51) Int. Cl.
    *G06F 17/30*   (2006.01)
(52) U.S. Cl.
    CPC .................................. *G06F 17/303* (2013.01)
    USPC ....................................................... 707/803
(58) Field of Classification Search
    CPC .................................................. G06F 17/303
    See application file for complete search history.

(56) References Cited

U.S. PATENT DOCUMENTS

| | | | |
|---|---|---|---|
| 6,163,776 A * | 12/2000 | Periwal ............................. | 707/4 |
| 7,383,552 B2 | 6/2008 | Hudis et al. | |
| 7,555,743 B2 | 6/2009 | Sridhar et al. | |
| 7,587,425 B2 * | 9/2009 | Baikov et al. ..................... | 707/1 |
| 7,630,993 B2 * | 12/2009 | Adler et al. ........................ | 707/1 |
| 2003/0208505 A1 * | 11/2003 | Mullins et al. ................ | 707/102 |
| 2005/0257193 A1 * | 11/2005 | Falk et al. ..................... | 717/109 |
| 2005/0278361 A1 | 12/2005 | Brunell et al. | |
| 2005/0278693 A1 | 12/2005 | Brunell et al. | |
| 2005/0278708 A1 | 12/2005 | Zhao et al. | |
| 2005/0278709 A1 | 12/2005 | Sridhar et al. | |
| 2006/0004856 A1 | 1/2006 | Shen et al. | |
| 2006/0036721 A1 | 2/2006 | Zhao et al. | |
| 2006/0070082 A1 | 3/2006 | Sridhar et al. | |
| 2006/0085532 A1 | 4/2006 | Chu et al. | |

OTHER PUBLICATIONS

"Yang—A data modeling language for the Network Configuration Protocol (NTCONF) draft-Ietf-netmod-yang-13" dated Jun. 1, 2010, downloaded from the Internet on Sep. 17, 2011 < http://tools.ietf.org/html/draft-ietf-netmod-yang-13 > (186 pages).
"Yang—A data modeling language for the Network Configuration Protocol" dated Oct. 2010, downloaded from the Internet on Sep. 17, 2011 < http://tools.ietf.org/html/rfc6020 > (174 pages).
Common Yang Data Types draft-ietf-netmod-yang-types-09 dated Apr. 26, 2010, downloaded from the Internet on Sep. 17, 2011 < http://toools.ietf.org/html/draft-ietf-netmod-yang-types-09 > (32 pages).
"Structure of Management Information Version 2 (SMIv2)" dated Apr. 1999, downloaded from the Internet on Sep. 17, 2011 < http://tools.ietf.org/html/rfc2578 > (44 pages).

* cited by examiner

*Primary Examiner* — Dinku Gebresenbet
(74) *Attorney, Agent, or Firm* — Hickman Palermo Truong Becker Bingham Wong LLP

(57) ABSTRACT

Techniques in a data processor for translating an object-oriented data model to a YANG data model are described. In one embodiment, for example, a translator system is described for translating data representing an object-oriented data model construct to a data representing one or more YANG data model statements, the translator system comprises: an object-oriented data model construct identifier for identifying data representing an object-oriented data model construct; an object-oriented data model construct-to-YANG data model statement translator for translating the identified data to translated data representing one or more YANG data model statements; and a storing module for storing the translated data in one or more non-transitory computer-readable media.

31 Claims, 2 Drawing Sheets

TRANSLATING AN OBJECT-ORIENTED DATA MODEL TO A YANG DATA MODEL

TECHNICAL FIELD

The present disclosure relates generally to techniques in a data processor for data translation and, more particularly, to techniques in a data processor for translating an object-oriented data model to a YANG data model.

BACKGROUND

The Network Configuration ("NETCONF") protocol may be used to install, manipulate, and delete the management data of network devices. Management data includes configuration data and state data. In general, configuration data comprises the set of writeable data of the network device required to transform the network device from an initial state to a current state. State data comprises additional data of the network device that is not configuration data such as read-only status information and collected statistics.

The NETCONF protocol uses a remote procedure call (RPC)-based mechanism to facilitate network communications between a NETCONF client and a NETCONF server. Typically, the NETCONF client is a script or application running as part of a network management system and the NETCONF server is a network device. To install, manipulate, or delete the management data of a network device, the client encodes an RPC message in eXtensible Markup Language (XML) and sends the message to the network device using a secure, connection-oriented session. The network device responds with a reply message also encoded in XML.

The NETCONF protocol defines mechanisms that provide an asynchronous message notification delivery service. A client can indicate interest in receiving event notifications from a network device. The network device replies to indicate whether the subscription request was successful and, if it was successful, begins sending the event notifications to the client as events occur. The NETCONF protocol may serve as a supplementary network management protocol to the currently widely employed Simple Network Management Protocol (SNMP). For further description of the NETCONF protocol, see e.g., "NETCONF Configuration Protocol", a current Internet Engineering Task Force (IETF) proposed standard dated December 2006, the disclosure of which is hereby incorporated by reference as if fully set forth herein. A copy of this IETF proposed standard is available via the Internet (e.g., currently at /rfc/rfc4741.txt in the www.rfc-editor.org domain).

While the NETCONF protocol provides a building block for constructing a system for automated management of network devices, the NETCONF protocol does not provide a standardized way to create data models for management data, remote procedural calls (RPCs), and notifications. To that end, a data modeling language known as YANG is available for the NETCONF protocol. A YANG data model is structured as a module and zero or more sub-modules. A YANG data model defines a hierarchy of data which can be used for NETCONF-based operations, including configuration data, state data, remote procedure calls (RPCs), and notifications. The hierarchical organization of data is modeled as a tree in which each node has a name, and either a value or a set of one or more child nodes. A data model defined using YANG can be instantiated as XML data. The hierarchical structure of the XML data resembles the hierarchical organization of the YANG data model. A YANG data model may be authored by YANG module writers and YANG-tool chain developers using highly-readable C programming language-like syntax. For further description of YANG, see e.g., "YANG—A data modeling language for the Network Configuration Protocol (NETCONF)", a current Internet Engineering Task Force (IETF) proposed standard dated October 2010, the disclosure of which is hereby incorporated by reference as if fully set forth herein. A copy of this IETF proposed standard is available via the Internet (e.g., currently at /html/rfc6020 in the tools.ietf.org domain).

The YANG data modeling language provides a standardized and vendor-neutral way by which to model NETCONF configuration data, state data, remote procedure calls, and notifications. Currently, YANG data models are typically authored "by hand" using little more than a text editor or a word processor. Such manual authoring is tedious, time-consuming, and error-prone and slows the adoption and implementation of the NETCONF protocol by network operators.

General Overview

Techniques in a data processor for translating an object-oriented data model to a YANG data model are described. In one embodiment, for example, a system is described for translating data representing an object-oriented data model construct into a data representing one or more YANG data model statements, the system comprises: an object-oriented data model construct identifier for identifying data representing an object-oriented data model construct; an object-oriented data model construct-to-YANG data model statement translator for translating the identified data into translated data representing one or more YANG data model statements; and a storing module for storing the translated data in one or more non-transitory computer-readable media.

In another embodiment, for example, a computer-implemented method is described for translating data representing an object-oriented data model construct into a data representing one or more YANG data model statements, the method comprises the steps of: identifying data representing an object-oriented data model construct; translating the identified data into translated data representing one or more YANG data model statements; and storing the translated data in one or more non-transitory computer-readable media.

In another embodiment, the present invention encompasses a non-transitory computer-readable medium configured to carry out the steps of the foregoing computer-implemented method.

DETAILED DESCRIPTION

Introduction

Techniques in a data processor for translating an object-oriented data model to a YANG data model are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In an embodiment, the techniques are embodied in an object-oriented data model-to-YANG data model translator system. The translator system may be implemented entirely in software, entirely in hardware, or in a combination of software and hardware, or may comprise a method that is performed by one or more processors, or may be embodied in a non-transitory computer-readable medium storing sequences of instructions which when executed by one or more processors cause performance of the method.

Network operators, network device manufacturers, and others may have existing object-oriented data models for network management information. For example, existing device management and network management applications may employ object-oriented data models to represent the devices they manage. Likewise, feature instrumentation developers may use object-oriented data models to model features that need to be instrumented for management purposes, and managed.

The translator system in various embodiments allows users to convert existing object-oriented data models of network management information to YANG data model without loss of object-oriented data model construct semantics. The translator system enables network operators, network equipment vendors, and tool vendors, among others, to generate YANG data model from existing object-oriented management information data models, rather than author YANG data models by hand, thereby facilitating the rapid development of YANG data model libraries and expediting the adoption of the NETCONF protocol within networked system environments. The translator system uses a set of one or more translation rules to translate object oriented data model constructs identified in object oriented data models to YANG data model statements. Specific translation rules are described in greater detail below.

Translator System

Figure 1:
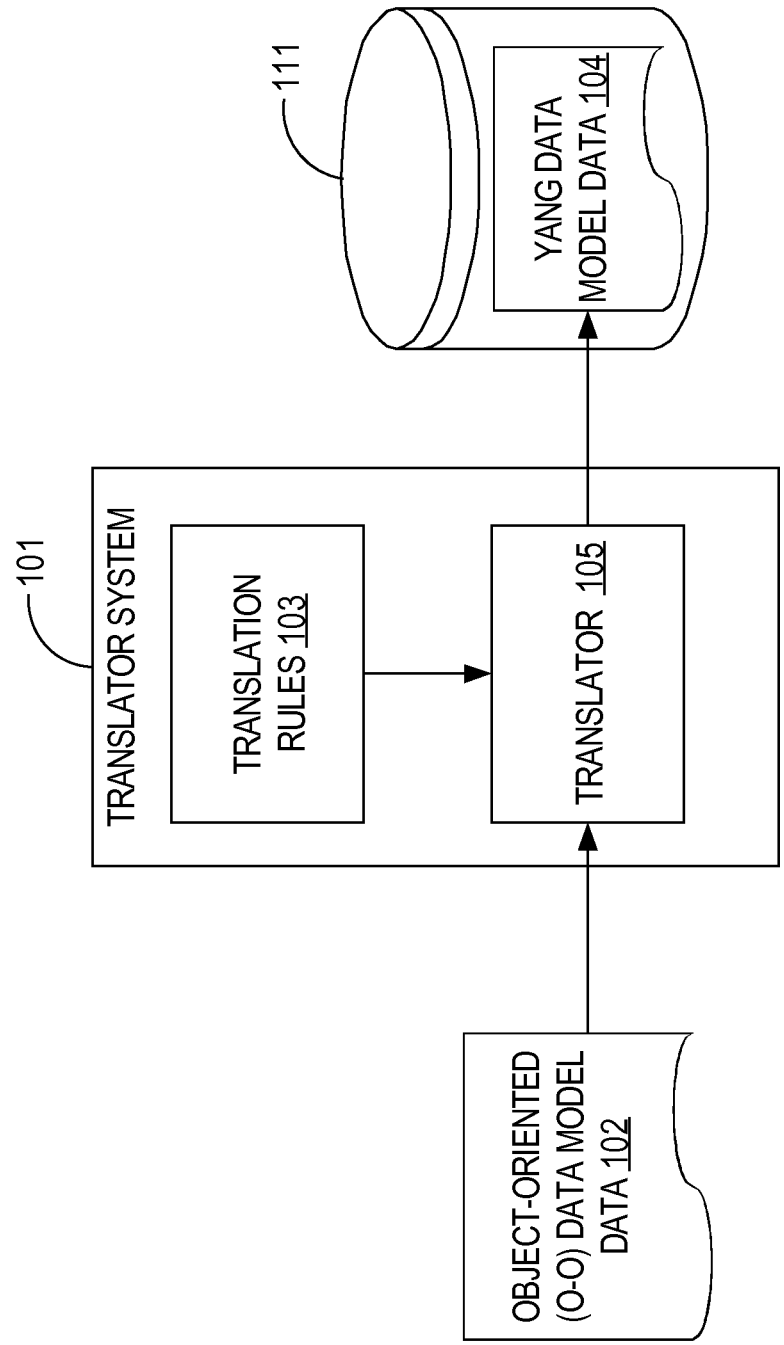
FIG. 1 is a block diagram of an environment in which the techniques for translating an object-oriented data model to a YANG data model may be embodied.

FIG. 1 is a block diagram of an environment 100 in which the techniques for translating an object-oriented data model to a YANG data model may be embodied. Environment 100 may comprise a computer or multiple computers that are coupled using a data communication network. As shown, environment 100 includes object-oriented data model data 102, translator system 101, data storage medium 111, and YANG data model data 104. As also shown at FIG. 1, translator system 101 comprises translation rules 103 and translator 105. The components of translator system 101 and their operations are described below. The translator system 101 may comprise a computer, including a special-purpose computer or a general-purpose computer storing, hosting or configured with one or more computer programs, stored data, or other instructions and data elements which when executed and use cause performing the functions described herein.

Object-oriented data model data 102 represents an object-oriented data model of management information. Data 102 may comprise one or more stored computer programs, data descriptions, or other structured or expressive stored data. The object-oriented data model may use a number of different object-oriented data model constructs to model the management information. For example, inheritance may be used to model that one class of objects also belongs to another class of objects. As another example, containment may be used to model that one class of objects may contain or be a repository for another class of objects. As yet another example, polymorphism may be used to model that one class of objects may appear like and be used as another class of objects. Specific techniques for translating these and other object-oriented data model constructs to YANG data model statements are provided below.

Object-oriented data model data 102 may be provided by or obtained from any number of object-oriented data model data sources. Non-limiting examples of object-oriented data model data sources include one or more databases, one or more servers, one or more networks, one or more network management information systems, and one or more files. For example, object-oriented data model data sources 121 may comprise a data model stored with or maintained by a network management computer program application. Object-oriented data model data 102 can be in virtually any data format suitable for expressing the data model in a form understandable by a computer. That data format may also be human readable. For example, in one embodiment, object-oriented data model data 102 is formatted in Extensible Markup Language (XML) format. However, embodiments of the invention are not limited to object-oriented data model data 102 being formatted as XML and other data formats may be used.

Translator system 101 produces YANG data model data 104 by translating one or more object-oriented data model constructs identified in object-oriented data model data 102 to one or more YANG data model statements according to translation rules 103. The one or more YANG data model statements are formatted and stored in YANG syntax format as YANG data model data 104 on data storage medium 111.

YANG syntax is similar to that of SMIng and computer programming languages like C and C++. Each YANG statement starts with a keyword, followed by zero or one argument, followed either by a semicolon (";") or a block of sub-statements enclosed within braces ("{ }"). A YANG sub-statement is a YANG statement declared within the braces ("{ }") of another YANG statement.

In an embodiment, translator system 101 comprises a translator module 105 for translating object-oriented data model data 102 to YANG data model data 104 according to translation rules 103. Translator module 105 may comprise one or more computer programs or other software elements, ASIC or FPGA logic, or a combination thereof. In operation, translator module 105 identifies one or more object-oriented data model constructs in object-oriented data model data 102. Translator module 105 translates each identified object-oriented data model construct into one or more YANG data model statements according to translation rules 103. Translator module 105 stores the one or more YANG data model statements as part of YANG data model data 104 on data storage medium 111.

According to one embodiment, translator module 105 is configured to convert an existing object-oriented data model 102 of management information to a YANG data model 104 that can be instantiated for use with the NETCONF protocol. Translation of object-oriented data model constructs to YANG data model statements is based on a set of one or more translation rules 103.

Translation rules 103 provide a generic mapping between object-oriented data model constructs to YANG data model statements. Translator 105 applies translation rules 103 to particular object-oriented data model data 102 to produce corresponding YANG data model data 104 that can be instantiated as XML data for use in NETCONF implementations. The translation rules 103 are configured to result in a compact YANG data model definition 104 that avoids unnecessary hierarchy levels. At the same time, the translation rules 103 preserve object-oriented construct semantics during translation.

Translation Rules

The translator module 105 of the translator system 101 generates YANG data model data 104 from object-oriented data model data 102 according to a set of translation rules 103. Example translation rules are described in greater detail below.

Extension Holder YANG Module

According to one embodiment, the translator system generates and stores a series of pre-defined YANG extension statements as YANG sub-statements of a pre-defined YANG module statement thereby defining an "extensionHolder" YANG module. The "extensionHolder" YANG module and the YANG extension statements defined therein are referred to in YANG statements generated by the translator system to facilitate the translation of object-oriented data model data 102 to YANG data model data 104 without loss of object-oriented data model construct semantics.

In one embodiment, the translator system generates one or more pre-defined YANG statements representing an Extension Holder YANG module for grouping a set of pre-defined YANG extension statements. As explained below, the pre-defined YANG extension statements defined by the Extension Holder YANG module are imported and used by other YANG modules generated by translator system to attach non-YANG data model semantics such as object-oriented data model semantics to other YANG statements generated by the translator system.

The following is an example of an Extension Holder YANG module generated by the translator system according to an embodiment:

```
0: module extensionHolder {
1:      extension implements {
2:          description "used to know the name of the package being implemented"
3:          argument "name";
4:      }
5:      extension extends {
6:          description "used to know the name of the package being extended"
7:          argument "name";
8:      }
9:      extension severity {
10:         description "conveys the severity level of the data contained in the error report"
11:         argument "name";
12:     }
13:     extension ref {
14:         description "name of the stand-alone configData definition being referred to"
15:         argument "name";
16:     }
17:     extension deleteRule {
18:         description "conveys the severity level of the data contained in the error report"
19:         argument "name";
20:     }
21:     extension inverse {
22:         description "name of the Object that the inverse pointer should point to"
23:         argument "name";
24:     }
25:     extension targetRole {
26:         description "specifies the role of the Object in a relationship which is either parent/child/peer"
27:         argument "name";
28:     }
29: } //end of extensionHolder module
```

In the above example, the declaration of a YANG module begins at line 0. The YANG module is given the name "extensionHolder". This name may be used as handle by other modules to import the Extension Holder YANG module. The name "extensionHolder" is merely an example and another name could be used. Also in the above example, the Extension Holder YANG module comprises a set of YANG extension statements. Each YANG extension statement defines a new statement that can be imported and used by other YANG modules. The argument to each YANG extension statement is an identifier that is the new keyword for the extension. For example, the YANG extension statement beginning at line 1 defines the new keyword "implements".

In one embodiment, each YANG extension statement generated by the translator system comprises two YANG sub-statements. The description YANG sub-statement provides a high-level textual description of the extension. The argument YANG sub-statement is used to provide the name of the argument to the keyword. Usage examples of these YANG extension statements are described in greater detail below.

Object-Oriented Packages

An object-oriented package is namespace for organizing classes and data in a logical manner. A definition of an object-oriented package in an object-oriented data model is an object-oriented data model construct for declaring an object-oriented package. According to one embodiment, a definition of an object-oriented package in an object-oriented data model is translated by the translator system to one or more YANG data model statements that include one YANG module statement.

By translating a definition of an object-oriented package in an object-oriented data model to a YANG module, the translator system provides a convenient container for other translation data produced by the translator system including data produced by the translator system in translating classes and data contained in the object-oriented package. For clarity of explanation, a YANG module definition to which a definition of an object-oriented package is translated by the translator system is referred to hereinafter as a Package YANG module.

The name given by the translator system to a Package YANG module is derived from the name of the object-oriented package as defined in the object-oriented data model. This ensures that the Package YANG module is assigned a name that is most likely unique within a domain of YANG modules equivalent in scope to the domain of object-oriented packages to which the object-oriented package being translated belongs. Each Package YANG module imports the Extension Holder YANG module so that the definitions inside the Extension Holder YANG module are available inside the Package YANG module.

In one embodiment, modularity within a Package YANG module is achieved by the translator system through the use of YANG sub-modules. The translator system uses YANG sub-modules to split a complex object-oriented package into several pieces where all the YANG sub-modules of the Package YANG module contribute to the same namespace. For example, consider an object-oriented package that defines a set of object-oriented classes, configuration data, operational data, and event reporting data. Translator system could split this object-oriented package into four YANG sub-modules: one for data representing translation of the object-oriented classes, another for data representing translation of the configuration data, yet another for data representing translation of the operational data, and yet another for data representing translation of the event reporting data.

The following is an example of a Package YANG module generated by the translator system according to an embodiment of the invention:

```
0: module examplePackage {
1:     import extensionHolder {
2:         prefix "examplePackage";
3:     }
4:     include examplePackage_configDataDef;
5:     include examplePackage_classesDef;
6:     include examplePackage_operationalDataDef;
7:     include examplePackage_eventReportDef;
8:     include examplePackage_typeDef;
9: }
```

In this example, the translator system has generated a YANG module definition with the name "examplePackage". In generating this module definition, the translator system used the name given to the object-oriented package that is being translated as defined in the object-oriented data model. At line 1, the YANG import statement is used to import the Extension Holder YANG module so that definitions inside the Extension Holder YANG module are available inside the "examplePackage" YANG module and any sub-modules included in the "examplePackage" YANG module. The YANG prefix statement at line 2 inside the YANG import statement beginning at line 1 defines the prefix to be used in other YANG statements inside the "examplePackage" YANG module when accessing definitions inside the Extension Holder YANG module. In this example the translator system has prefixed each sub-module name with the name of the object-oriented package that is being translated. This prefixing provides each imported sub-module with a name that is likely to be unique across YANG module generated by the translator system. The name is likely to be unique because the name of the object-oriented package from which the prefix is derived is likely to be unique across object-oriented packages translated by the translator system to YANG modules.

In the above example, the translator system has split the object-oriented package into five YANG sub-modules. The YANG include statements at lines 4-8 are used to make content from the five YANG sub-modules available to the "examplePackage" YANG module. The argument to each of the YANG include statements is an identifier which is the name of the YANG sub-module to include.

As mentioned, YANG sub-modules are used by the translator system to provide modularity for the Package YANG module when translating an object-oriented package. For example, a YANG sub-module of a Package YANG module can be used to contain YANG data model statements generated by the translator system in translating object-oriented class definitions of the object-oriented package. The following is an example of a YANG sub-module generated by the translator system according to an embodiment of the invention:

```
0: submodule examplePackage_classesDef {
1:     belongs-to "examplePackage" {
2:         prefix "examplePackage";
3:     }
4: /* YANG data model statements generated by the translator system in
translating object-oriented class definitions of the object-oriented package
follow here. */
5: .
6: .
7: .
8: }
```

As shown in the previous example, this example sub-module is imported by the "examplePackage" YANG module. In this example, the translator system has generated a YANG sub-module definition with the name "examplePackage_classesDef". The YANG belongs-to statement at line 1 specifies the YANG module to which the "examplePackage_classesDef" YANG sub-module belongs. The argument to the YANG belongs-to statement is an identifier which is the name of the YANG module. The YANG prefix sub-statement at line 2 assigns a prefix for the YANG module to which the YANG sub-module belongs. All definitions in the YANG sub-module and any included YANG sub-modules are accessed by using the prefix "examplePackage".

Object-Oriented Classes

According to one embodiment, a YANG sub-module generated by the translator system and imported by a Package YANG module provides a container for YANG data model statements generated by the translator system in translating object-oriented class definitions of the object-oriented package.

An object-oriented class defines data and the methods that operate on that data as a data type. An object-oriented class is a blueprint or template from which instances of the object-oriented class commonly referred to as objects may be created or instantiated. Unlike other data modeling constructs, object-oriented classes support inheritance, a fundamental construct of object-oriented data modeling. A definition of an object-oriented class in an object-oriented data model is an object-oriented data model construct for declaring an object-oriented class. According to one embodiment, a definition of an object-oriented class in an object-oriented data model is translated to one or more YANG data model statements that include a YANG grouping statement.

By translating a definition of an object-oriented class in an object-oriented data model to a YANG grouping, the translator system preserves the re-usability of the data and behavior defined by the object-oriented class in the YANG data model. For clarity of explanation, a YANG grouping definition to which a definition of an object-oriented class is translated by the translator system is referred to hereinafter as a Class YANG grouping. The translator system derives the name of the Class YANG grouping from the name of the object-oriented class. The Class YANG grouping provides a container for YANG data model statements generated by the translator system representing object-oriented class inheritance (if any), any instance variables of the object-oriented class, and any instance methods of the object-oriented class.

Object-Oriented Class Inheritance

Object-oriented class inheritance allows an object-oriented class to inherit data and behavior from another object-oriented class (the super-class) while at the same time allowing the inheriting object-oriented class (the sub-class) to define its own data and behavior. Typically, inheritance between two object-oriented classes is declared in an object-oriented data model using a particular keyword in association with the definition of the object-oriented class that is inheriting from another object-oriented class (i.e., in association with the object-oriented sub-class). For example, an object-oriented data model may declare that object-oriented class A "extends" or "implements" object-oriented class B. In this example, object-oriented class A is the sub-class and object-oriented class B is the super-class. A declaration of object-oriented inheritance between two object-oriented classes in an object-oriented data model is an object-oriented data model construct for declaring inheritance between two object-oriented classes.

According to one embodiment, a declaration of object-oriented class inheritance between two object-oriented classes in an object-oriented data model is translated to one or more YANG data model statements that include a YANG uses statement declared as a YANG sub-statement of the YANG grouping statement generated by the translator system for the object-oriented sub-class. The "implements" YANG extension statement defined in the Extension Holder YANG module is used to provide the name of the object-oriented super-class. In cases where the object-oriented sub-class further defines or overrides the data or behavior of the object-oriented super-class, the YANG refine sub-statement of the YANG uses statement is used.

Object-Oriented Class Instance Variables

Object-oriented class instance variables are data variables of an object-oriented class that are available to instances (objects) of the class. Typically, an object-oriented class instance variable is one of two data types: primitive or complex. Common examples of a primitive data type instance variable are string, integer, byte, and character. A reference or pointer to another object-oriented class is an example of a complex data type instance variable. A declaration of an object-oriented class instance variable of an object-oriented class is an object-oriented data model construct for declaring an object-oriented class instance variable of the object-oriented class. According to one embodiment, a declaration of a primitive type object-oriented class instance variable is translated by the translator system to one or more YANG data model statements that include a YANG leaf statement. The YANG leaf statement is declared inside the YANG grouping statement corresponding to the object-oriented class. According to one embodiment, a declaration of a complex type object-oriented class instance variable is translated by the translator system to one or more YANG data model statements that include a YANG list statement. In another embodiment, a declaration of a complex type object-oriented class instance variable is translated by the translator system to one or more YANG data model statements that include a YANG leaflist statement. The YANG list or the YANG leaflist statement is declared inside the YANG grouping statement corresponding to the object-oriented class.

Object-Oriented Class Instance Methods

Object-oriented class instance methods are methods of an object-oriented class that may be invoked on instances (objects) of the object-oriented class. A declaration of an object-oriented class instance method of an object-oriented class is an object-oriented data model construct for declaring an object-oriented class instance method of the object-oriented class.

According to one embodiment, a declaration of an object-oriented class instance method of an object-oriented class is translated by the translator system into one or more YANG data model statements that includes a YANG rpc statement. The YANG rpc statement is declared inside the YANG grouping statement corresponding to the object-oriented class. Each input parameter to the object-oriented instance method is translated by the translator system to a YANG leaf statement or a YANG leaflist statement inside the YANG input sub-statement of the YANG rpc statement. Each output parameter of the object-oriented instance method is translated by the translator system to a YANG leaf statement or a YANG leaflist statement inside the YANG output sub-statement of the YANG rpc statement. Input and output parameters are translated to YANG leaf or YANG leaflist statements depending on whether the parameters are single values or a collection of values respectively.

In addition, the translator system declares a particular YANG leaflist statement inside the YANG input sub-statement of the YANG rpc statement to hold identifiers YANG grouping instances corresponding to instances of the object-oriented class for which the object-oriented class instance method is defined. The identifiers are used to simulate the run-time behavior of an object-oriented class instance methods. In particular, the identifiers may be passed at NETCONF run-time as input to YANG rpc invocations to identify the YANG grouping instance to which the YANG rpc invocation applies.

Example of Translating an Object-Oriented Class

The following is an example of a YANG grouping generated by the translator system according to an embodiment of the invention. This example demonstrates how object-oriented classes, object-oriented class inheritance, object-oriented class instance variables, and object-oriented class instance methods are translated to YANG data model statements by the translator system according to an embodiment.

```
0:  grouping MyService {
1:       examplePackage:implements "ManagedService";
2:       uses ManagedService;
3:       leaf serviceName {
4:            type string;
5:       }
6:       list operationalData_ref {
7:            key serviceName;
8:            uses operationalData;
9:       }
10:      rpc MyService_action {
11:           input {
12:                leaflist MyService_instance_keys {
13:                     leaf serviceName{
14:                          type string;
15:                     }
16:                }
17:                leaf stringAt_input {
18:                     type string;
19:                }
20:                leaf unsignedIntAt_input {
21:                     type unsignedInt;
22:                }
23:           } /* end input */
24:           output{
25:                leaf byteAt_output {
26:                     type byte;
27:                }
28:                leaf enum_output {
29:                     type examplePackage: configtypeAt;
30:                }
31:                leaf complex_array {
32:                     type examplePackage: complexAtSequence;
33:                }
34:           } /* end output */
35:      } /* end rpc */
36: }
```

At line 0, a YANG grouping statement is begun. The identifier given to the YANG grouping (in this example "MyService") is derived from the name given to the object-oriented class that is being translated by the translator system. The translator system uses the YANG grouping statement to define a reusable block of nodes corresponding to the object-oriented class being translated.

In the above example, assume that in the object-oriented data model that the object-oriented class MyService is declared as a sub-class of the object-oriented class ManagedService. According to one embodiment, as indicated at line 2 in the above example, the translator system generates a YANG uses statement providing as an argument the name of the YANG grouping generated by the translator system for the object-oriented class ManagedService. The YANG uses statement at line 2 is used by the translator system to reference the ManagedService YANG grouping definition. The effect of this reference is that the nodes defined by the ManagedService YANG grouping definition are copied into the current YANG schema tree. In one embodiment, the YANG augment and YANG refine statements are used by the translator system to implement object-oriented sub-class overriding. For example, data and methods defined by the ManagedService object-oriented class that are overridden by the MyService object-oriented class definition can be simulated in a YANG data model through use of the YANG refine and the YANG augment sub-statement.

In the above example, assume that the MyService object-oriented class declares an object-oriented class instance variable named "serviceName" of primitive type string. According to one embodiment, as indicated by lines 3-5, the translator system generates, for each primitive type object-oriented class instance variable, a YANG leaf statement as a sub-statement of the YANG grouping statement corresponding to the object-oriented class. The YANG leaf statement is used here to define a leaf node in the schema tree below the node in the schema tree for the YANG grouping. The argument given to the YANG leaf statement is the name of the object-oriented class instance variable as defined in the object-oriented class. The YANG leaf statement includes a YANG type sub-statement specifying the primitive type of the object-oriented class instance variable as defined in the object-oriented class.

In the above example, further assume that the MyService object-oriented class declares an object-oriented class instance variable named "operationgData_ref" that refers to (or points to) one or more instances of object-oriented class "operationalData". Further assume that instances (objects) of the object-oriented class operationalData are each uniquely identifiable amongst the instances by the value of the object-oriented class instance variable "serviceName" of the operationalData object-oriented class. According to one embodiment, as indicated by lines 6-9, the translator system generates, for each complex type object-oriented class instance variable, a YANG list statement as a sub-statement of the YANG grouping statement corresponding to the object-oriented class. This creates an interior node within the YANG schema tree below the node in the schema tree for the YANG grouping. The argument given to the YANG list statement is the name of the object-oriented class instance variable as defined in the object-oriented class. The translator system generates at least two YANG sub-statements of the YANG list statement. A YANG key statement is used to declare a key element of the YANG list for holding the identifier of the YANG grouping instance corresponding to the object-oriented class referred to or pointed at by the object-oriented instance variable corresponding to the YANG list. A YANG uses statement is used within the YANG list to facilitate reusability of the nodes defined by the YANG grouping corresponding to the object-oriented class referred to or pointed at by the object-oriented instance variable corresponding to the YANG list. This re-use flexibility is made possible by the translator system by translating all object-oriented class definitions to YANG groupings.

In the above example, further assume that the MyService object-oriented class declares an object-oriented class instance method named "MyService_action". The instance method accepts as input two input parameters: one of primitive type string with a parameter name of "stringAt_input" and another of primitive type unsigned integer with a parameter name of "unsignedIntAt_input". The instance method also provides three output parameters: one of primitive type byte with a parameter name of "byteAt_output", another of complex type examplePackage:configtypeAt with a parameter name of "enum_output", and yet another of complex type examplePackage:complexAtSequence with a parameter name "complex_array".

According to one embodiment, as indicated by lines 10-35 above, the translator system generates, for each object-oriented class instance method declared for an object-oriented class, a YANG rpc statement. The translator system uses the YANG rpc statement to define a NETCONF RPC operation. The identifier specified as the argument to the YANG rpc statement is derived from the name of the object-oriented class instance method being translated. For example, in the above example, the name specified as the argument to the YANG rpc statement beginning at line 10 is "MyService_action" which is derived from the name of an object-oriented class instance method on the MyService object-oriented class.

YANG does not provide modeling constructs for directly modeling the notion of an object-oriented class or an instance of an object-oriented class. In one embodiment, to indicate which instance of an object-oriented class an object-oriented class instance method is a part of, an identifier of the YANG grouping instance corresponding to the instance of an object-oriented class is passed as an additional input parameter to the NETCONF rpc operation. To accommodate this, the translator system, when generating a YANG rpc statement for an object-oriented class instance method, generates an additional set of YANG leaves to the YANG rpc input parameter that captures the identifier of the YANG grouping instance.

For example, as indicated by lines 12-16 above, in addition to the two YANG leaf statements for capturing the input parameters to the MyService_action object-oriented class instance method, a YANG leaflist statement is included to capture the identifier of the instance of the MyService YANG grouping. Because a YANG leaflist statement is used, more than one identifier may be declared in circumstances where more than one identifier is needed to uniquely identify the instance of the YANG grouping. In the above example, only the serviceName identifier is needed to uniquely identify an instance of the MyService YANG grouping.

Complex Data Types

YANG only provides direct support for some primitive data types such as string, float, etc. and does not provide direct support for complex data types such as sequences, choices, and enumerations. In one embodiment, a complex data type defined in an object-oriented data model is translated by translator system into one or more YANG statements representing the complex data type. In one embodiment, the translator system supports translation of sequences, choices, and enumerations to YANG data model statements.

For a sequence type, the sequence type is translated to a YANG grouping statement and individual sequence elements of the sequence are translated to YANG leaf statements within the YANG grouping statement. The following is an example of a YANG grouping statement representing a translation by the translator system of a sequence data type with six elements:

```
0: grouping complexAtSequence {
1:      leaf intAt {
2:          type int;
3:      }
4:      leaf stringAt {
5:          type string;
6:      }
7:      leaf unsignedLongAt {
8:          type unsignedLong;
9:      }
10:     leaf configtypeAt {
11:         type comet_test: configtypeAt;
12:     }
```

```
13:     leaf simpleManyipAddrAt {
14:         type comet_test_lib: SimpleIpAddress;
15:     }
16:     leaf hexBinaryAt {
17:         type hexBinary;
18:     }
19: }
```

For choice types, the choice type is translated to YANG choice and YANG case statements in which the argument to YANG choice statement is an identifier of the choice type and each argument to the YANG case statements represents a choice of the choice type. The following is an example of a YANG choice statement representing a translation by the translator system of a choice data type with three choices:

```
0: choice complexAtChoice {
1:      case inAt {
2:          leaf inAt {
3:              type int;
4:          }
5:      }
6:      case stringAt {
7:          leaf stringAt {
8:              type string;
9:          }
10:     }
11:     case simplehexBinaryAt {
12:         leaf simplehexBinaryAt {
13:             type examplePackage: SimpleHexBinary;
14:         }
15: }
```

For enumeration complex data types, the enumeration data type is translated by the translator system to a YANG typedef statement that includes a YANG type statement specifying the YANG built-in enumeration data type. Each option of the enumeration is translated to a separate YANG enum statement. The following is an example of a translation of an enumeration complex data type specifying five options:

```
0: typedef configtypeAt {
1:      type enumeration {
2:          enum Enum1 {
3:              value 1;
4:          }
5:          enum Enum2 {
6:              value 2;
7:          }
8:          enum Enum3 {
9:              value 3;
10:         }
11:         enum Enum4 {
12:             value 4;
13:         }
14:         enum Enum5 {
15:             value 5;
16:         }
17:     }
18: }
```

Containment Hierarchies

In object-oriented data models, containment may be modeled as an explicit relationship between object-oriented classes. According to one embodiment, the translator system maps a containment relationship between object-oriented classes to a YANG list sub-statement of the YANG grouping statement corresponding to the containing object-oriented class. The YANG list statement contains information about the contained class through a YANG uses statement. This effectively reiterates the definition of the contained class within the containing class. Revisiting an example from above, the following YANG grouping statement generated for the object-oriented class MyService includes as a sub-statement a YANG list statement for modeling a containment relationship between the container object-oriented class (MyService) and the contained object-oriented class (operationalData).

```
0: grouping MyService {
1:      .
2:      .
3:      .
4:      list operationalData_ref {
5:          key serviceName;
6:          uses operationalData;
7:      }
8:      .
9:      .
10:     .
11: }
```

Event Definitions

In one embodiment, a definition of an event defined in an object-oriented data model is translated by the translator system into one or more YANG statements comprising a YANG notification statement. For example, consider the following event definition expressed in XML format:

```
0: <eventReportDef>
1:      <eventReport name="EventDebug">
2:          <description>Event with debug event severity</description>
3:          <eventAttribute name="URIAt" type="anyURI">
4:              <description>event attribute with URI data
                    type</description>
5:          </eventAttribute>
6:          <eventAttribute name="booleanAt" relatedAttribute=""
                type="boolean">
7:              <description>Boolean data type in event</description>
8:          </eventAttribute>
9:          <eventAttribute name="byteAt" type="byte">
10:             <description>byteAt data type within events</description>
12:         </eventAttribute>
13:     </eventReport>
14: </eventReportDef>
```

According to one embodiment, an event definition is translated by the translator system to a YANG notification statement. Each attribute of the event definition is translated by the translator system to a YANG leaf statement declared as a sub-statement of the YANG notification statement. For example, the above example event definition may be translated to the following YANG statements:

```
0: notification EventDebug {
1:      description "Event with debug event severity";
2:      leaf URIAt {
3:          type anyURI;
4:          description "event attribute with URI data type";
5:      }
6:      leaf booleanAt {
7:          type boolean;
8:          description "Boolean data type in event";
9:      }
10:     leaf byteAt {
11:         type byte;
12:         description "byteAt data type within events";
13:     }
14: }
```

In the above example, the translator system uses the name provided in the event definition as the argument to the YANG notification statement. Each attribute of the event definition has been translated to a YANG leaf statement. The type of each attribute as defined in the event definition has been translated to a YANG type sub-statement of the corresponding YANG leaf statement.

Computer-Based Implementing Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
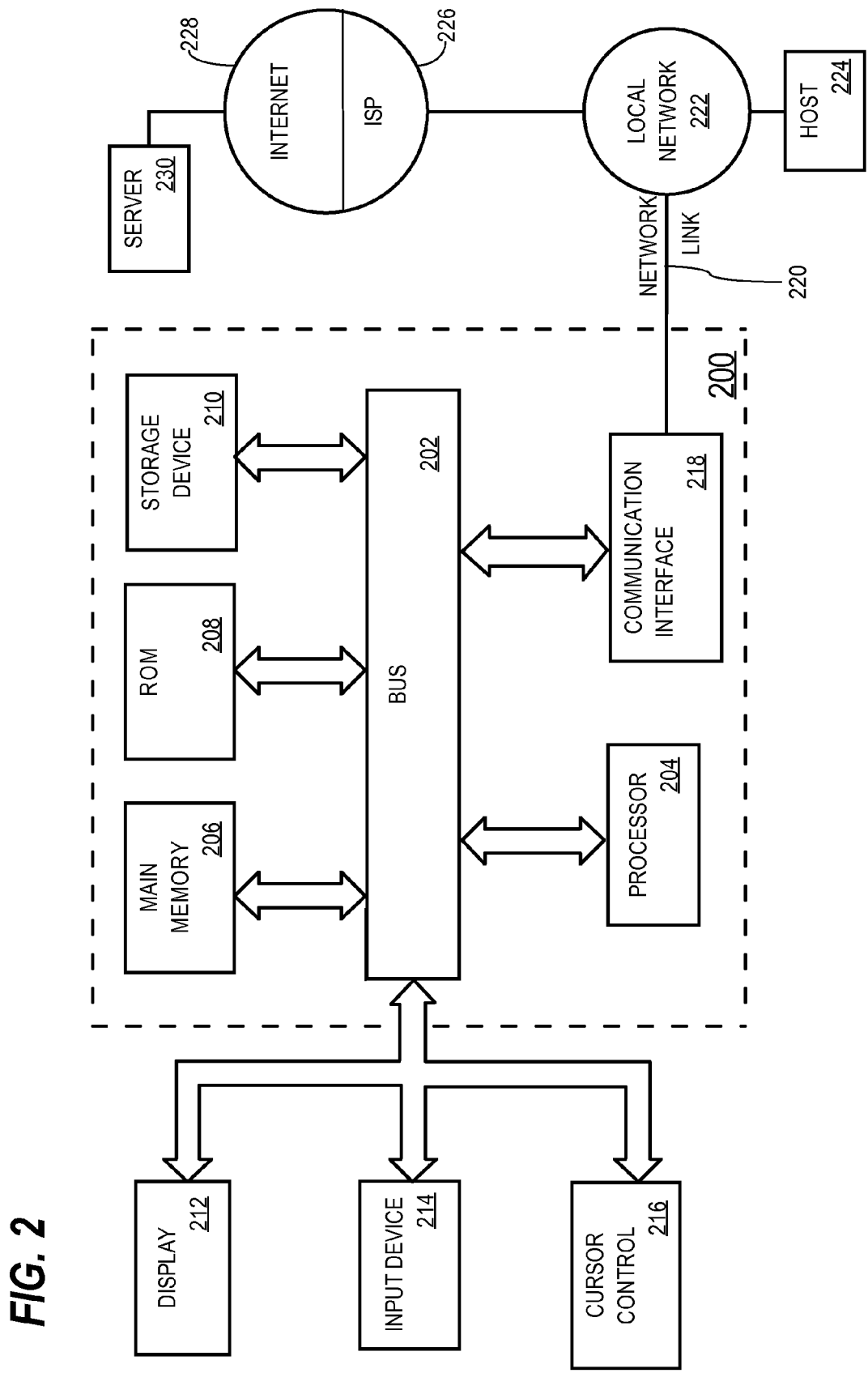
FIG. 2 illustrates a computer system upon which an embodiment may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method implemented in a computer having a processor and memory, the method comprising:
    identifying first data representing an object-oriented data model, which comprises a plurality of object-oriented data model constructs for modeling object-oriented classes;
    wherein identifying the first data comprises identifying the first data amongst data representing an object-oriented data model;
    translating the first data to second data, which represents one or more YANG data model statements, but which is not extensible markup language data and which does not comprise constructs for modeling the object-oriented classes;
    wherein the one or more YANG data model statements capture relationships between the object-oriented data model constructs;
    wherein each YANG statement of the one or more YANG data model statements represented by the second data comprises a YANG keyword, which is followed by zero or more arguments, which is followed by either a semicolon or a block of YANG sub-statements enclosed within braces; and
    storing the second data in one or more non-transitory computer-readable media; wherein storing the second data comprises storing the second data as part of data representing a YANG data model.

2. The method of claim 1, wherein an object-oriented data model construct, from the plurality of object-oriented data model constructs, is one of:
    an object-oriented package definition,
    an object-oriented class definition,
    an definition of object-oriented inheritance between two object-oriented classes,
    an declaration of a primitive type object-oriented class instance variable of an object-oriented class,
    an declaration of a complex type object-oriented class instance variable of an object-oriented class,
    an declaration of an object-oriented class instance method of an object-oriented class
    a definition of an event, or
    a definition of a containment and peer relationship between two object-oriented classes.

3. The method of claim 1, wherein the one or more YANG data model statements includes one of:
    a YANG module statement,
    a YANG grouping statement,
    a YANG uses statement,
    a YANG leaf statement declared as a YANG sub-statement of a YANG grouping statement,
    a YANG list statement declared as a YANG sub-statement of a YANG grouping statement,
    a YANG rpc statement declared as a YANG sub-statement of a YANG grouping statement,
    a YANG notification statement,
    a YANG container statement, or
    a YANG leaflist statement declared as a YANG sub-statement of a YANG grouping statement.

4. The method of claim 1, wherein translating the first data to the second data comprises translating the first data to second data based on one or more translation rules.

5. The method of claim 1,
    wherein an object-oriented data model construct, from the plurality of object-oriented data model constructs, is a particular object-oriented package definition;
    wherein the one or more YANG data model statements includes a particular YANG module statement; and
    wherein translating the first data to the second data comprises translating the particular object-oriented package definition to the particular YANG module statement.

6. The method of claim 5, wherein the particular object-oriented package definition comprises a name for the particular object-oriented package, and wherein translating the particular object-oriented package definition to the particular YANG module statement comprises deriving the argument to the particular YANG module statement from the name for the particular object-oriented package.

7. The method of claim 1,
    wherein an object-oriented data model construct, from the plurality of object-oriented data model constructs, is a particular object-oriented class definition;
    wherein the one or more YANG data model statements includes a particular YANG grouping statement; and
    wherein translating the first data to the second data comprises translating the particular object-oriented class definition to the particular YANG grouping statement.

8. The method of claim 7, wherein the particular object-oriented class definition comprises a name for the particular object-oriented class, and wherein translating the particular object-oriented class definition to the particular YANG grouping statement comprises deriving the argument to the particular YANG grouping statement from the name for the particular object-oriented class.

9. The method of claim 1,
    wherein an object-oriented data model construct, from the plurality of object-oriented data model constructs, is a particular definition of object-oriented inheritance between two object-oriented classes;

wherein the one or more YANG data model statements include a particular YANG uses statement; and wherein translating the first data to the second data comprises translating the particular definition of object-oriented inheritance between the two object-oriented classes to the particular YANG uses statement.

10. The method of claim 1, wherein an object-oriented data model construct, from the plurality of object-oriented data model constructs, is a particular declaration of a primitive type object-oriented class instance variable of a particular object-oriented class;

wherein the one or more YANG data model statements includes a particular YANG leaf statement declared as a YANG sub-statement of a particular YANG grouping statement, the particular YANG grouping statement having been generated for the particular object-oriented class; and wherein translating the first data to the second data comprises translating the particular declaration of the primitive type object-oriented class instance variable of the particular object-oriented class to the particular YANG leaf statement.

11. The method of claim 1, wherein an object-oriented data model construct, from the plurality of object-oriented data model constructs, is a particular declaration of a complex type object-oriented class instance variable of a particular object-oriented class;

wherein the one or more YANG data model statements includes a particular YANG list statement declared as a YANG sub-statement of a particular YANG grouping statement, the particular YANG grouping statement having been generated for the particular object-oriented class;

wherein translating the first data to the second data comprises translating the particular declaration of the complex type object-oriented class instance variable of the particular object-oriented class to the particular YANG list statement.

12. The method of claim 1, wherein an object-oriented data model construct, from the plurality of object-oriented data model constructs, is a particular declaration of an object-oriented class instance method of a particular object-oriented class;

wherein the one or more YANG data model statements includes a particular YANG rpc statement as a YANG sub-statement of a particular YANG grouping statement, the particular YANG grouping statement having been generated for the particular object-oriented class;

wherein translating the first data to the second data comprises translating the particular declaration of the object-oriented class instance method of the particular object-oriented class to the particular YANG rpc statement.

13. The method of claim 1, wherein:

the computer is a translator computer system comprising translation logic executed by the processor and operatively coupled to the memory;

identifying first data representing an object-oriented data model comprises the translation logic identifying the first data in the memory;

translating the first data to second data representing one or more YANG data model statements comprises the translation logic transforming a state of the memory by translating the first data to the second data; and storing the second data in the one or more non-transitory computer-readable media comprises the translation logic storing the second data in the one or more non-transitory computer-readable media.

14. A non-transitory computer-readable medium storing instructions, which, when executed by one or more processors, cause the one or more processors to perform:

identifying first data representing an object-oriented data model, which comprises a plurality of object-oriented data model constructs for modeling object-oriented classes;

wherein identifying the first data comprises identifying the first data amongst data representing an object-oriented data model;

translating the first data to second data, which represents one or more YANG data model statements, but which is not extensible markup language data and which does not comprise constructs for modeling the object-oriented classes;

wherein the one or more YANG data model statements capture relationships between the object-oriented data model constructs;

wherein each YANG statement of the one or more YANG data model statements represented by the second data comprises a YANG keyword, which is followed by zero or more arguments, which is followed by either a semicolon or a block of YANG sub-statements enclosed within braces; and storing the second data in one or more non-transitory computer-readable media;

wherein storing the second data comprises storing the second data as part of data representing a YANG data model.

15. The non-transitory computer-readable medium of claim 14, wherein an object-oriented data model construct, from the plurality of object-oriented data model constructs, is one of:

an object-oriented package definition, an object-oriented class definition, a definition of object-oriented inheritance between two object-oriented classes, a declaration of a primitive type object-oriented class instance variable of an object-oriented class, a declaration of a complex type object-oriented class instance variable of an object-oriented class, a declaration of an object-oriented class instance method of an object-oriented class, a definition of an event, or a definition of a containment relationship between two object-oriented classes.

16. The non-transitory computer-readable medium of claim 14, wherein the one or more YANG data model statements includes one of:

a YANG module statement, a YANG grouping statement, a YANG uses statement, a YANG leaf statement declared as a YANG sub-statement of a YANG grouping statement, a YANG list statement declared as a YANG sub-statement of a YANG grouping statement, a YANG rpc statement declared as a YANG sub-statement of a YANG grouping statement, a YANG notification statement, a YANG container statement, or a YANG leaflist statement declared as a YANG sub-statement of a YANG grouping statement.

17. The non-transitory computer-readable medium of claim 14, wherein translating the first data to the second data comprises translating the first data to second data based on one or more translation rules.

18. The non-transitory computer-readable medium of claim 14,
wherein an object-oriented data model construct, from the plurality of object-oriented data model constructs, is a particular object-oriented package definition;
wherein the one or more YANG data model statements includes a particular YANG module statement; and
wherein translating the first data to the second data comprises translating the particular object-oriented package definition to the particular YANG module statement.

19. The non-transitory computer-readable medium of claim 18, wherein the particular object-oriented package definition comprises a name for the particular object-oriented package, and wherein translating the particular object-oriented package definition to the particular YANG module statement comprises deriving the argument to the particular YANG module statement from the name for the particular object-oriented package.

20. The non-transitory computer-readable medium of claim 14,
wherein an object-oriented data model construct, from the plurality of object-oriented data model constructs, is a particular object-oriented class definition;
wherein the one or more YANG data model statements includes a particular YANG grouping statement; and
wherein translating the first data to the second data comprises translating the particular object-oriented class definition to the particular YANG grouping statement.

21. The non-transitory computer-readable medium of claim 20, wherein the particular object-oriented class definition comprises a name for the particular object-oriented class, and wherein translating the particular object-oriented class definition to the particular YANG grouping statement comprises deriving the argument to the particular YANG grouping statement from the name for the particular object-oriented class.

22. The non-transitory computer-readable medium of claim 14,
wherein an object-oriented data model construct, from the plurality of object-oriented data model constructs, is a particular definition of object-oriented inheritance between two object-oriented classes;
wherein the one or more YANG data model statements include a particular YANG uses statement; and
wherein translating the first data to the second data comprises translating the particular definition of object-oriented inheritance between the two object-oriented classes to the particular YANG uses statement.

23. The non-transitory computer-readable medium of claim 14,
wherein an object-oriented data model construct, from the plurality of object-oriented data model constructs, is a particular declaration of a primitive type object-oriented class instance variable of a particular object-oriented class;
wherein the one or more YANG data model statements includes a particular YANG leaf statement declared as a YANG sub-statement of a particular YANG grouping statement, the particular YANG grouping statement having been generated for the particular object-oriented class; and
wherein translating the first data to the second data comprises translating the particular declaration of the primitive type object-oriented class instance variable of the particular object-oriented class to the particular YANG leaf statement.

24. The non-transitory computer-readable medium of claim 14,
wherein an object-oriented data model construct, from the plurality of object-oriented data model constructs, is a particular declaration of a complex type object-oriented class instance variable of a particular object-oriented class;
wherein the one or more YANG data model statements includes a particular YANG list statement declared as a YANG sub-statement of a particular YANG grouping statement, the particular YANG grouping statement having been generated for the particular object-oriented class;
wherein translating the first data to the second data comprises translating the particular declaration of the complex type object-oriented class instance variable of the particular object-oriented class to the particular YANG list statement.

25. The non-transitory computer-readable medium of claim 14,
wherein an object-oriented data model construct, from the plurality of object-oriented data model constructs, is a particular declaration of an object-oriented class instance method of a particular object-oriented class;
wherein the one or more YANG data model statements includes a particular YANG rpc statement as a YANG sub-statement of a particular YANG grouping statement, the particular YANG grouping statement having been generated for the particular object-oriented class;
wherein translating the first data to the second data comprises translating the particular declaration of the object-oriented class instance method of the particular object-oriented class to the particular YANG rpc statement.

26. An apparatus comprising:
a processor;
one or more stored sequences of instructions which, when executed by the processor, cause the processor to perform:
identifying first data representing an object-oriented data model, which comprises a plurality of object-oriented data model constructs for modeling object-oriented classes;
wherein identifying the first data comprises identifying the first data amongst data representing an object-oriented data model;
translating the first data to second data, which represents one or more YANG data model statements, but which is not extensible markup language data and which does not comprise constructs for modeling the object-oriented classes;
wherein the one or more YANG data model statements capture relationships between the object-oriented data model constructs;
wherein each YANG statement of the one or more YANG data model statements represented by the second data comprises a YANG keyword, which is followed by zero or more arguments, which is followed by either a semicolon or a block of YANG sub-statements enclosed within braces; and
storing the second data in one or more non-transitory computer-readable media;
wherein storing the second data comprises storing the second data as part of data representing a YANG data model.

27. The apparatus of claim 26, wherein an object-oriented data model construct, from the plurality of object-oriented data model constructs, is one of:
an object-oriented package definition,
an object-oriented class definition,
a definition of object-oriented inheritance between two object-oriented classes,
a declaration of a primitive type object-oriented class instance variable of an object-oriented class,
a declaration of a complex type object-oriented class instance variable of an object-oriented class,
a declaration of an object-oriented class instance method of an object-oriented class,
a definition of an event, or
a definition of a containment relationship between two object-oriented classes.

28. The apparatus of claim 26, wherein the one or more YANG data model statements includes one of:
a YANG module statement,
a YANG grouping statement,
a YANG uses statement,
a YANG leaf statement declared as a YANG sub-statement of a YANG grouping statement,
a YANG list statement declared as a YANG sub-statement of a YANG grouping statement,
a YANG rpc statement declared as a YANG sub-statement of a YANG grouping statement,
a YANG notification statement,
a YANG container statement, or
a YANG leaflist statement declared as a YANG sub-statement of a YANG grouping statement.

29. An apparatus comprising:
a processor;
a memory;
identifier logic configured to identify, in the memory, first data representing an object-oriented data model, which comprises a plurality of object-oriented data model constructs for modeling object-oriented classes;
wherein identifying the first data comprises identifying the first data amongst data representing an object-oriented data model;
translation logic configured to transform a state of the memory by translating the first data to second data, which represents one or more YANG data model statements, but which is not extensible markup language data and which does not comprise constructs for modeling the object-oriented classes;
wherein the one or more YANG data model statements capture relationships between the object-oriented data model constructs;
wherein each YANG statement of the one or more YANG data model statements represented by the second data comprises a YANG keyword, which is followed by zero or more arguments, which is followed by either a semicolon or a block of YANG sub-statements enclosed within braces; and
storing logic configured to retrieve the second data from the memory and store the second data in one or more non-transitory computer-readable media;
wherein storing the second data comprises storing the second data as part of data representing a YANG data model.

30. The apparatus of claim 29, wherein an object-oriented data model construct, from the plurality of object-oriented data model constructs, is one of:
an object-oriented package definition,
an object-oriented class definition,
a definition of object-oriented inheritance between two object-oriented classes,
a declaration of a primitive type object-oriented class instance variable of an object-oriented class,
a declaration of a complex type object-oriented class instance variable of an object-oriented class,
a declaration of an object-oriented class instance method of an object-oriented class,
a definition of an event, or
a definition of a containment relationship between two object-oriented classes.

31. The apparatus of claim 29, wherein the one or more YANG data model statements includes one of:
a YANG module statement,
a YANG grouping statement,
a YANG uses statement,
a YANG leaf statement declared as a YANG sub-statement of a YANG grouping statement,
a YANG list statement declared as a YANG sub-statement of a YANG grouping statement,
a YANG rpc statement declared as a YANG sub-statement of a YANG grouping statement,
a YANG notification statement,
a YANG container statement, or
a YANG leaflist statement declared as a YANG sub-statement of a YANG grouping statement.

* * * * *